United States Patent
Parikh

(10) Patent No.: US 10,740,829 B2
(45) Date of Patent: *Aug. 11, 2020

(54) ACTIONS USING ENCODED UNIQUE PRODUCT IDENTIFIERS

(71) Applicant: PayPal, Inc., San Jose, CA (US)

(72) Inventor: Aalap D. Parikh, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 60 days.

This patent is subject to a terminal disclaimer.

(21) Appl. No.: 16/050,135

(22) Filed: Jul. 31, 2018

(65) Prior Publication Data

US 2019/0073711 A1   Mar. 7, 2019

Related U.S. Application Data

(63) Continuation of application No. 14/791,063, filed on Jul. 2, 2015, now Pat. No. 10,037,562, which is a continuation of application No. 12/634,478, filed on Dec. 9, 2009, now abandoned.

(51) Int. Cl.
| | |
|---|---|
| *G06Q 30/00* | (2012.01) |
| *G06Q 30/06* | (2012.01) |
| *G06Q 20/04* | (2012.01) |
| *G06Q 20/12* | (2012.01) |
| *G06Q 20/32* | (2012.01) |

(52) U.S. Cl.
CPC ........ *G06Q 30/0635* (2013.01); *G06Q 20/04* (2013.01); *G06Q 20/12* (2013.01); *G06Q 20/3276* (2013.01); *G06Q 30/06* (2013.01); *G06Q 30/0601* (2013.01)

(58) Field of Classification Search
CPC ................................ G06Q 30/06–08
USPC ................................ 705/26.1–27.2
See application file for complete search history.

(56) References Cited

U.S. PATENT DOCUMENTS

| | | | |
|---|---|---|---|
| 10,037,562 B2 * | 7/2018 | Parikh | .......... G06Q 20/04 |
| 2009/0031071 A1 | 1/2009 | Chiu | |
| 2010/0082445 A1 | 4/2010 | Hodge et al. | |

OTHER PUBLICATIONS

Gao, Jerry et al., Understanding 2D-BarCode Technology and Applications in M-Commerce-Design and Implementation of a 2D Barcode Processing Solution, 2007, COMPSAC, pp. 1-8.

* cited by examiner

*Primary Examiner* — Ethan D Civan
(74) *Attorney, Agent, or Firm* — Haynes and Boone, LLP

(57) ABSTRACT

An encoded image may be captured by a camera to produce particular information from a display that cannot be deciphered by a human eye (e.g., a quick response code a.k.a. a QR code). The encoded image can be decoded and then the information contained therein can be acted upon by a user device, such as a mobile phone device. The user may be prompted for additional information, redirected to a particular website, sent to a specific web application or online authentication portal, etc. A service provider computer system may also perform processing on information gleaned from the encoded image, and provide information regarding the subsequent outcome of the processing to a user.

20 Claims, 5 Drawing Sheets

ACTIONS USING ENCODED UNIQUE PRODUCT IDENTIFIERS

CROSS REFERENCE TO RELATED APPLICATION

This application is a continuation of U.S. application Ser. No. 14/791,063, filed Jul. 2, 2015, now U.S. Pat. No. 10,037,562 which claims priority to U.S. application Ser. No. 12/634,478, filed Dec. 9, 2009, which are both incorporated herein by reference in their entirety.

BACKGROUND

Field of the Invention

The present invention generally relates to on-line payments and more particularly to making payments using a product identifier code.

Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Purchasing through the Internet from the convenience of a consumer's home, office, or virtually anywhere (with mobile devices) is one main reason why on-line purchases are growing faster and faster.

One typical way consumers locate, identify, and pay for a product is to simply go to a store, find the desired products, have the products scanned at checkout, and pay at the store, such as using cash, check, a debit card, a credit card, or vouchers/coupons. However, this requires a consumer to be at a physical point of sale (POS) and provide physical payment, which is time-consuming and can be inconvenient and burdensome. Shopping on-line overcomes at least the requirement of being at the POS. With on-line shopping, the user searches the Internet, accesses a retailer/merchant website, selects desired products, places them in a virtual cart, and pays on-line, either directly to the merchant or through a payment provider. A disadvantage of on-line shopping is that the consumer must be in front of a PC or other computing device, such that shopping and payment is confined to an experience in front of the PC. Furthermore, it may be cumbersome and time-consumer for the consumer to enter required information for an on-line payment, which may include a credit card/account number, billing address, etc.

Yet another way is for consumers to locate and purchase products is to use a catalog, newspaper, advertisement pamphlet, or other print media to first locate a product. Once located, the consumer goes to the store or logs into a specified web site to select and pay for the product(s), such as described above. Thus, this method suffers the same disadvantages as the other two methods of either purchase/payment in person at a physical POS or having to be in front of a computing device for selection and payment.

Thus, there is a need for a way that consumers can select and pay for a desired product without the disadvantages of the conventional methods above.

SUMMARY

In accordance with one embodiment, a system and method includes first capturing an image of a product code, such as by taking a picture of the code with a camera on a phone. In one embodiment, the code is a Quick Response (QR) code that includes sufficient information about the product and price to allow the user to purchase and pay for the product with information from the code. Once captured on the mobile device, the image is processed to obtain the product information, such as price, merchant, and description. The user may then select the product for purchase. Purchase may be accomplished with a simple payment button on the device screen that the user selects. Product and payment information may then be transmitted by the device to a payment provider to process the payment to the appropriate recipient.

These and other features and advantages of the present invention will be more readily apparent from the detailed description of the embodiments set forth below taken in conjunction with the accompanying drawings.

Figure 1:
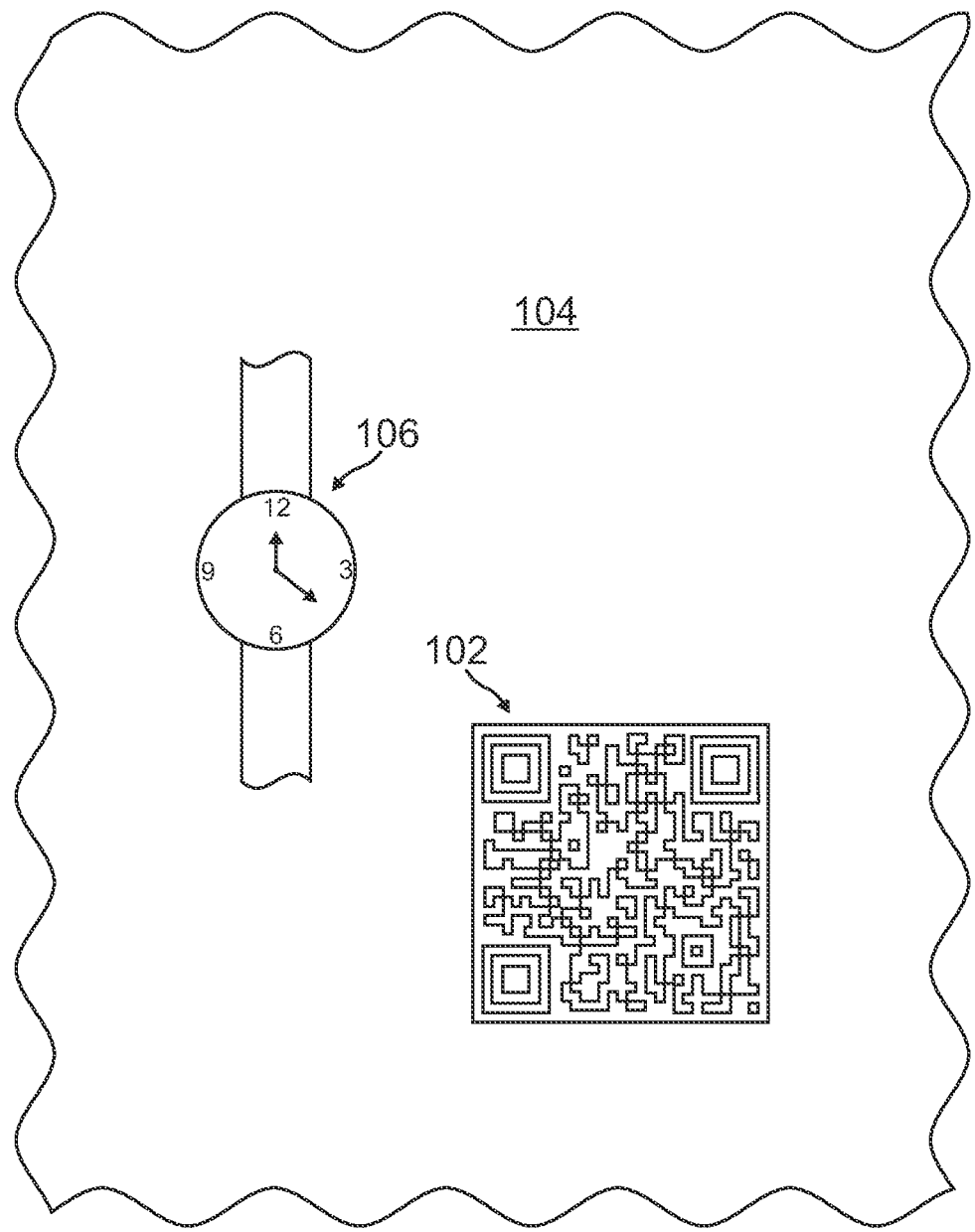
FIG. 1 shows a QR code affixed to a tangible medium, which can be captured and used for payment according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 shows a two-dimensional product code affixed to tangible medium, such as a piece of paper, container, or product, or even a web page. In one embodiment, the two-dimensional code is a quick response or QR code 102, created by Denso-Wave of Japan, and the tangible medium is a page 104 from a catalog or magazine. Other types of two-dimensional or other codes may also be suitable, such as the PDF417 code by Symbol Technologies, the DataMatrix code by RVSU Acuity CiMatrix, and the Maxi Code by UPS. QR code 102 contains information about an associated product or service on page 104. Note that as used herein, product or item refers to both products and services. For example, page 104 may be advertising a specific DVD, CD, watch, type of clothing, a motorcycle, or virtually any product or service that is available for purchase. Note that QR code can also be displayed on other medium, such as the actual product itself, its container, or a web page. QR codes and other similar codes are able to contain large amounts of information, due in part to data being stored in both the horizontal and vertical directions of the code. In contrast, bar codes store data only in one direction, e.g., horizontally. As an example of the information storage differences, a conventional bar code can only store approximately 20 digits, while a QR code can handle up to several hundred times more information (e.g., over 7000 numeric characters or over 4000 alphanumeric characters). QR codes were created by Denso-Wave of Japan, and additional information can be obtained through Denso-Wave's web site.

Due to the large amounts of information capable of being stored on QR code 102, specific information may be encoded to convey desired information about the product/ service offered for sale. In the example of FIG. 1, page 104 of the magazine may show and briefly describe a product, such as a watch 106. However, page 104 may not have sufficient area to provide the consumer with all the needed information about the product or the merchant/advertiser may not want to clutter the page for fear of reducing the ad appeal. QR code 102 on page 104 can be encoded to provide information about watch 106 such as detailed product description, a URL link to a website of a merchant offering the watch for sale, a URL link to a website of the watch manufacturer, UPC code for the watch, price, watch options, payment remittance information, etc. Information on QR code 102 may be decoded to provide the user easy access or display to such information, including giving the user an option to pay for the product. Payment information may include merchant name, account information (such as recipient account number or identifier with a payment provider), and price.

Figure 2:
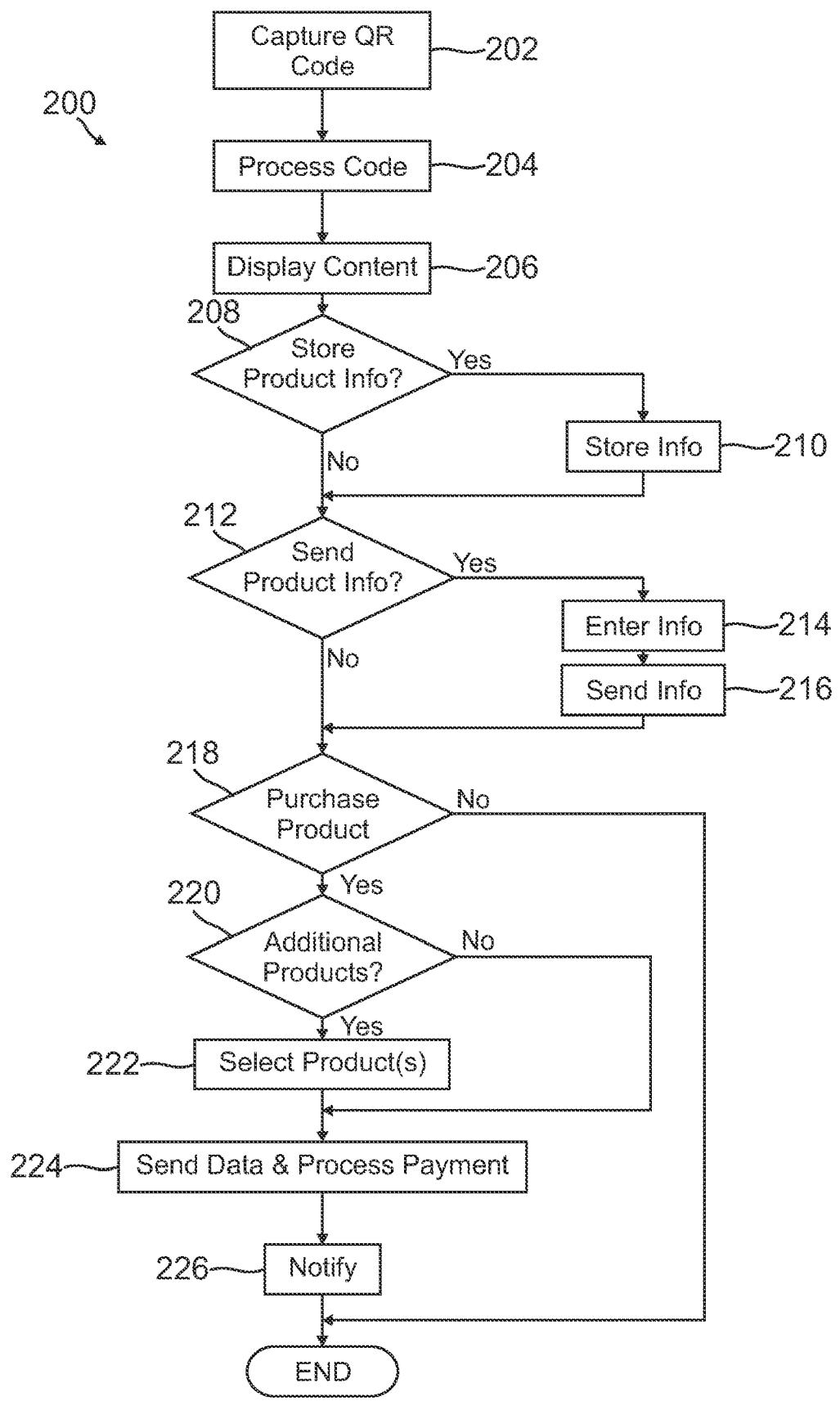
FIG. 2 is a flowchart showing a process for conducting a purchase and payment from a captured QR code according to one embodiment.

FIG. 2 is a flowchart 200 showing processes for making an on-line payment from a unique product code, such as QR code 102 of FIG. 1, according to one embodiment. At step 202, a consumer or user captures an image of the QR code, such as by taking a picture of the code or scanning the code using a camera on a mobile phone or any device that can capture an image. The QR code contains sufficient information about the product, price, and merchant to enable the user to purchase and pay for the product from the information contained in the product code. The QR code can then be decoded or processed, such as by software in the phone, at step 204. QR code reader/decoder software is commonly available. Once processed, content from the QR code is displayed on the user device at step 206.

The type of display can vary depending on the content of the QR code. For example, the user may be directed to a web page of the manufacturer or of a merchant selling the product, where the user can obtain more details about the product. The display may also show a more detailed description of the product, which may include one or more pictures of the product.

Next, various actions can be performed based on the captured QR code, starting with whether the user wants to store information about the product associated with the captured QR code at step 208. If so, the product information is stored in the device at step 210, which the user may later access, along with any other stored information about other products or about the same product but from a different store/purchase channel for possible comparison shopping. A determination is also made, at step 212, whether to send a message (such as SMS), a link to the product, or other information about the product from the captured QR code to someone else. If so, the user selects the desired transmission and enters the requested information at step 214. For example, if the user wants to send a link and/or message, the user may enter the recipient's email address, and if the user wants to send a text message, the user enters the phone number of the recipient's device. The selected data is then sent to the recipient at step 216. Note that steps 208-216, and other subsequent steps can be performed in any order and are not limited to the sequence shown.

Next, at step 218, a determination can be made whether the uses wishes to purchase the product associated with the captured QR code. This can be done by the user simply selecting a "buy" button or link associated with the product. After deciding whether to purchase the product, a determination can be made, at step 220, whether to purchase additional products stored on the user's device, such as products associated with previously captured QR codes. If more products are to be purchased, the user selects the desired product(s) at step 222. The previously stored products may be accessed by date captured, type, price, etc., where the user selects the products by clicking on a box, clicking on a buy button associated with the product, etc.

Once the desired product(s) for purchase have been selected, data is sent from the user's device, such as to a payment provider like PayPal, Inc. of San Jose, Calif., and processed at step 224. Examples of types of data include an account number of the recipient with the payment provider, although in other embodiments, the account number can be with a bank or other financial institution, payment amount for each selected product, and funding information of the user, such as an account number, user name, password, phone number associated with the user/account, etc. Processing may be debiting the appropriate funds from the user's designated account and crediting the appropriate funds to the recipient's or merchant's designated account(s). The user and/or the merchant may then be notified, at step 226, that payment has been made and received, such as with an email, text, on-screen confirmation, or voice message. Delivery of the purchased product(s) can then be made by the merchant to the consumer. Note that the delivery can be made at a physical POS or by shipping and could also be a digital download item like software or digital media such as video or music files. For example, if the user scans a QR code of a product, where the product is immediately available, such as at a retail store, the user may take delivery of the product at the POS as soon as payment is made, such as with the process described above.

Figure 3:
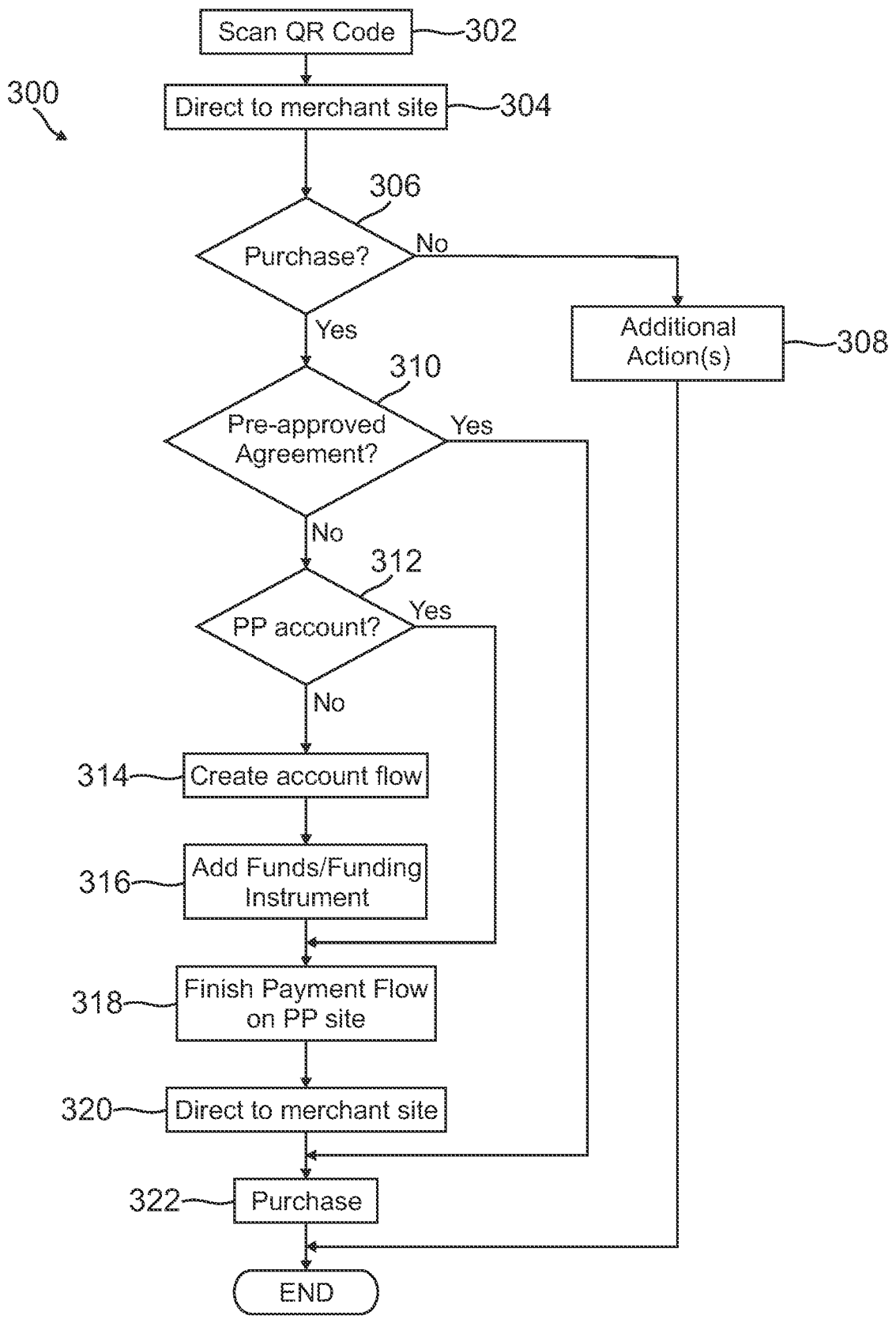
FIG. 3 is a flowchart showing a process for conducting a purchase and payment from a captured QR code by a first-time user according to one embodiment.

FIG. 3 is a flowchart 300 showing a method according to another embodiment, where the user does not have an account with the payment provider used to make the payment. At step 302, the user scans or captures a QR code or other unique product code, using a suitable device, such as a smart phone with a camera/scanner. Information about the product or service contained in the QR code is decoded, and the user is re-directed to a third party site, such as a merchant site, at step 304. For example, after capturing the QR code, the user's device displays a merchant web site offering the product from the QR code. Once on the site, the user may decide whether to purchase the product, such as with a "buy" button or link, at step 306. If the user decides not to make the purchase, the user may perform additional actions in step 308, such as sending a link to the product to another, saving the link for possible later use, etc.

However, if the user decides to purchase the product at step 306, a determination is made at step 310 whether the user has a pre-approved agreement with the site. This agreement may include an agreement with a payment provider processing a transaction between the user and the owner of the site, limits on transaction amount, etc. If there is such an agreement with the merchant, the user makes the purchase at step 322, such as following a procedure for making a payment based on the agreement. This may include simply selecting a "pay" or "purchase" button and may include some sort of authentication of the device and/or user. Confirmation of the payment may then be made to the user and/or merchant, followed by transfer of the purchased product from the merchant to the user.

If there is no payment agreement with the merchant, a determination is first made at step 312 whether the user has an account with a payment provider, such as PayPal, Inc. of San Jose, Calif. If so, the user proceeds with a payment flow at step 318. In one example, the user enters requested information on the payment provider site, which may include an account/user identifier, such as a password, PIN, email address, and/or phone number, funding source, and/or amount. Once the payment flow is completed on the payment provider site, the user is re-directed back to the merchant site at step 320. In embodiments, where the payment flow is on the merchant site, this step may be omitted. The purchase is then made at step 322.

If, as determined at step 312, the user does not have an account with a payment provider, the payment provider creates an account flow, at step 314, that the user can follow. For example, a mobile app may be loaded and accessed that prompts the user for various information to enter from the device in order to create the account. After the account is created, the user may fund the account at step 316, such as by designating or specifying a bank account or a credit card account as a funding source and specifying an amount to be transferred from the funding account. The payment process continues at steps 318, 320, and 322, as discussed above.

Figure 4:
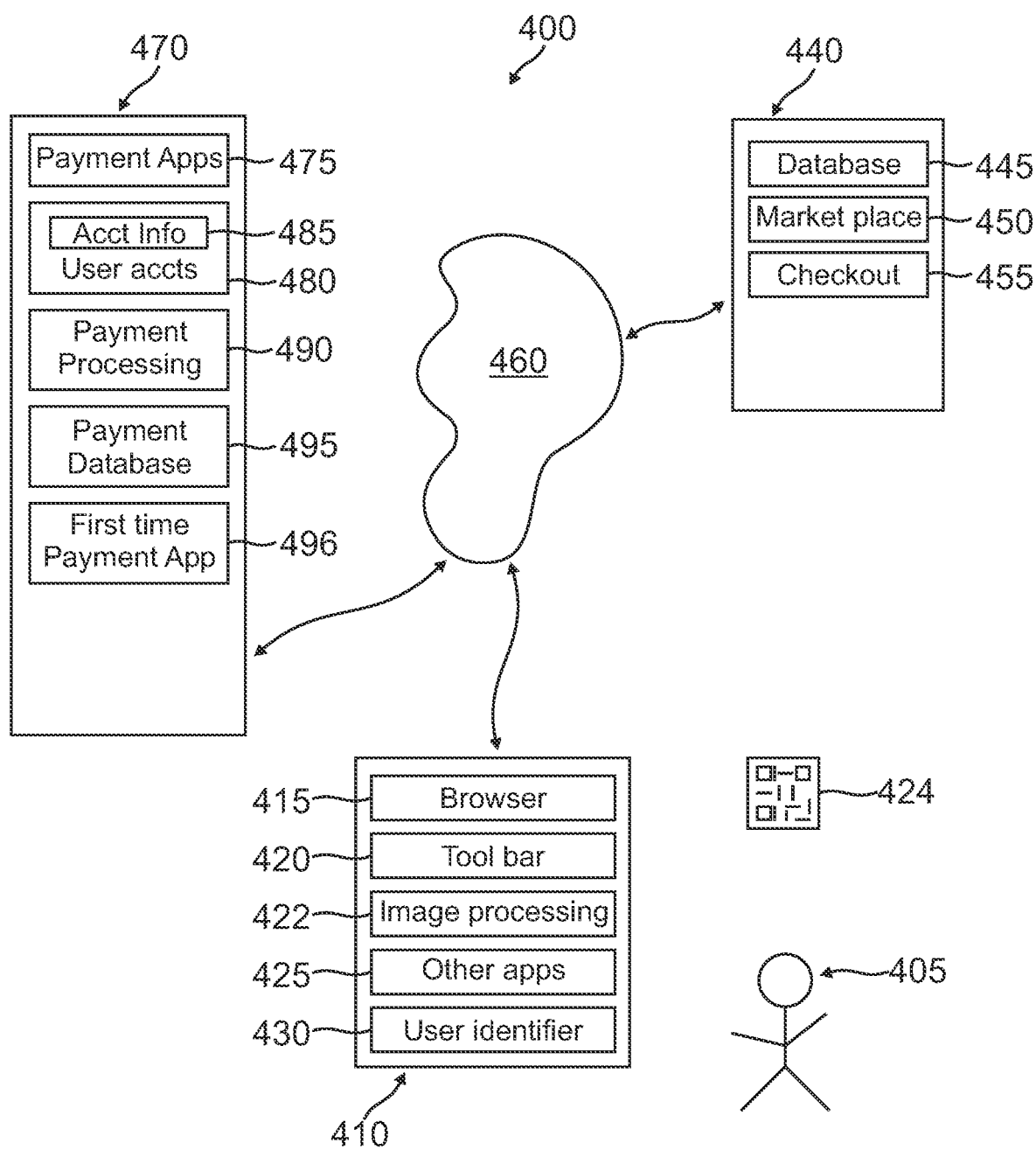
FIG. 4 is a block diagram of a networked system configured to purchase and pay for an item associated with a captured QR code in accordance with an embodiment of the invention.

FIG. 4 is a block diagram of a networked system 400 configured to handle a purchase transaction, such as described above, in accordance with an embodiment of the invention. System 400 includes a user or consumer device 410, a merchant server 440, and a payment service provider server 470 in communication over a network 460. Payment service provider server 470 may be maintained by a payment provider, such as PayPal, Inc. of San Jose, Calif.

User device 410, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

User device 410 may be implemented using any appropriate combination of hardware and/or software configured for wired and/or wireless communication over network 460. For example, in one embodiment, user device 410 may be implemented as a personal computer, equipped with or capable of receiving data from a scanner and/or camera, of a user 405 in communication with the Internet. In other embodiments, user device 410 may be implemented as a wireless telephone, personal digital assistant (PDA), notebook computer, and/or other types of computing devices equipped with or capable of receiving data from a scanner and/or camera.

As shown, user device 410 may include one or more browser applications 415 which may be used, for example, to provide a convenient interface to permit user 405 to browse information available over network 460. For example, in one embodiment, browser application 415 may be implemented as a web browser configured to view information available over the Internet, such as when directed to a URL site from a captured QR code. User device 410 may also include one or more toolbar applications 420 which may be used, for example, to provide client-side processing for performing desired tasks in response to operations selected by user 405. In one embodiment, toolbar application 420 may display a user interface in connection with browser application 415 as further described herein.

In addition, user device 410 may include an image processing application 422 that receives an image captured from a scanner or camera on user device 410 and processes the image to decode data found on the image. As discussed above, the image may be of a QR code 424 or other unique product code containing data sufficient to purchase the product associated with the code. Image processing application 422 may contain software for decoding the code. Code 424 may be displayed on a page, product, product container, product package, web site, or any other form that allows user 405 to scan or photograph code 424 using user device 410.

User device 410 may further include other applications 425 as may be desired in particular embodiments to provide desired features to user device 410. For example, such other applications 425 may include security applications for implementing client-side security features, programmatic client applications for interfacing with appropriate application programming interfaces (APIs) over network 460, or other types of applications. Applications 425 may also include email and texting applications that allow user 405 to send and receive emails and texts through network 460. User device 410 includes one or more user identifiers 430 which may be implemented, for example, as operating system registry entries, cookies associated with browser application 415, identifiers associated with hardware of user device 410, or other appropriate identifiers, such as used for payment/user/device authentication. In one embodiment, user identifier 430 may be used by a payment service provider to associate user 405 with a particular account maintained by the payment service provider as further described herein.

Merchant server 440 may be maintained, for example, by an on-line merchant offering various products and/or services, such as associated with a captured QR code, in exchange for payment to be received over network 460. In this regard, merchant server 440 includes a database 445 identifying available products and/or services (e.g., collectively referred to as items) which may be made available for viewing and purchase by user 405, such as when redirected to the site from a captured QR code. Accordingly, merchant server 440 also includes a marketplace application 450 which may be configured to serve information over network 460 to browser 415 of user device 410. In one embodiment, user 405 may interact with marketplace application 450 through browser applications over network 460 in order to view various products or services identified in database 445, using data from a captured product code.

Merchant server 440 also includes a checkout application 455 which may be configured to facilitate the purchase by user 405 of goods or services identified by marketplace application 450. Checkout application 455 may be configured to accept payment information from user 405 and/or from payment service provider server 470 over network 460.

Payment service provider server 470 may be maintained, for example, by an online payment service provider which may provide payment on behalf of user 405 to the operator of merchant server 440. In this regard, payment service provider server 470 includes one or more payment applications 475 which may be configured to interact with user device 410 and/or merchant server 440 over network 460 to facilitate the purchase of goods or services by user 405 of user device 410 from merchant server 440. In one embodiment, payment service provider server 470 may be provided by PayPal, Inc.

Payment service provider server 470 also maintains a plurality of user accounts 480, each of which may include account information 485 associated with individual users. For example, account information 485 may include private financial information of users of devices such as account numbers, passwords, phone numbers, credit card information, bank information, or other financial information which may be used to facilitate online transactions by user 405. Advantageously, payment application 475 may be configured to interact with merchant server 440 on behalf of user 405 during a transaction with checkout application 455 to track and manage purchases made by users.

Payment application 475 may include a mobile payment processing application 490 which may be configured to receive information from a mobile user device and/or merchant server 440 for storage in a payment database 495. Payment application 475 may be further configured to match data received from a mobile device with information stored in payment database 495 for payment authentication and processing. As discussed this data may include the user's device phone number, email, password, and/or PIN.

Payment service provider server 470 may further include a first-time user payment application 496 which may be configured to generate and process a request for payment received from a user device of a user who does not have an account with the payment provider. In one embodiment, first-time user payment application 496 may be configured to perform the steps described above for making payment to a merchant from a first-time user.

Figure 5:
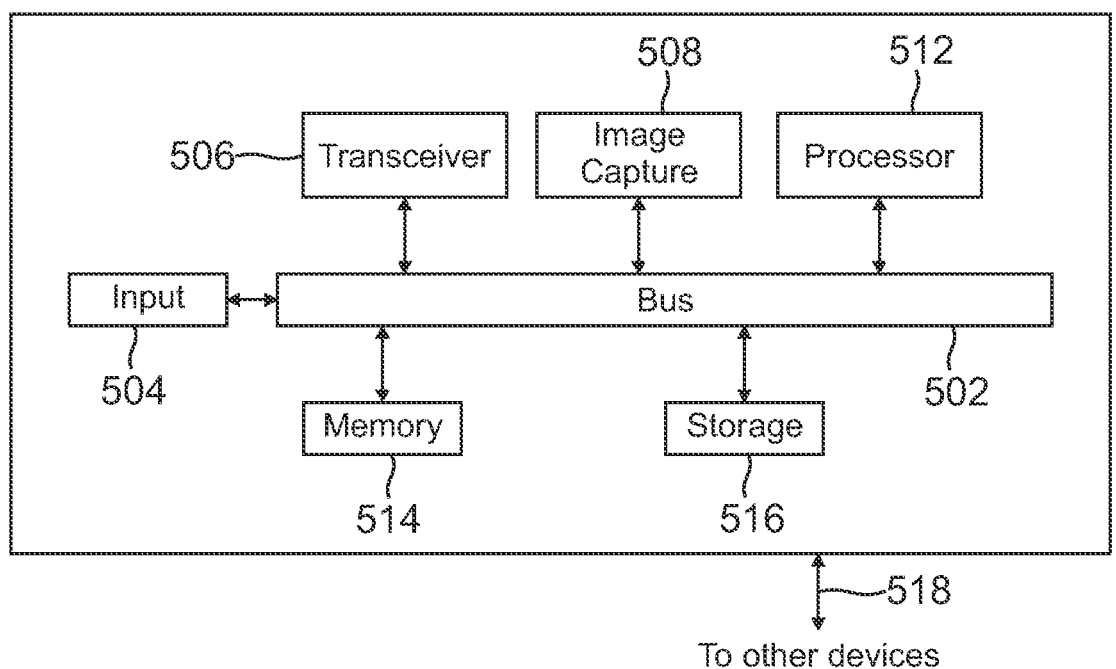
FIG. 5 is a block diagram of a computer system suitable for implementing one or more embodiments of the present disclosure.

FIG. 5 is a block diagram of a computer system 500 suitable for implementing one or more embodiments of the present disclosure. In various implementations, the user device may comprise a personal computing device (e.g., a personal computer, laptop, cell phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

Computer system 500 includes a bus 502 or other communication mechanism for communicating information data, signals, and information between various components of computer system 500. Components include an input component 504 that processes a user action, such as selecting keys from a keypad/keyboard, selecting one or more buttons or links, etc., and sends a corresponding signal to bus 502. A transceiver 506 transmits and receives signals between computer system 500 and other devices, such as a merchant server, payment provider server, or another user device. In one embodiment, the transmission is wireless, although other transmission mediums and methods may also be suitable. An image capture mechanism 508, such as a scanner or camera, captures an image, such as a QR code. A processor 512, which can be a micro-controller, digital signal processor (DSP), or other processing component, processes these various signals, such as for display on computer system 500 or transmission to other devices via a communication link 518. The captured image from mechanism 508 may be processed within mechanism 508 or by processor 512.

Components of computer system 500 also include a system memory component 514 (e.g., RAM) and a static storage component 516 (e.g., ROM). Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    capturing, via a camera of a user device, an encoded image corresponding to an item, wherein the encoded image includes information not decipherable by a human;
    decoding the encoded image to obtain item information usable to facilitate a transaction that includes the item, the item information including an item identifier and seller information that uniquely identifies a seller of the item;
    subsequent to the decoding, receiving a user input from a user interface component of the user device;
    responsive to the user input, the user device transmitting, to a service provider computer system, the seller information and additional information usable to facilitate a purchase transaction for the item; and
    subsequent to the transmitting, receiving an indication that the purchase transaction has been processed by the service provider computer system.

2. The method of claim 1, wherein the encoded image stores data in a horizontal direction and in a vertical direction.

3. The method of claim 1, further comprising:
    subsequent to the decoding, launching an application on the user device that is configured to access web content; and
    causing web content corresponding to the item information to be displayed on the user device via the application.

4. The method of claim 1, further comprising, subsequent to the decoding, storing the item information.

5. The method of claim 1, further comprising storing the item information on the user device subsequent to the decoding.

6. The method of claim 1, wherein the item is a service.

7. The method of claim 1, further comprising causing an authentication login for an account corresponding to the service provider computer system to be presented to a user on the user device, wherein the authentication login includes content retrieved from a web server of a service provider corresponding to the service provider computer system.

8. The method of claim 1, wherein the item information includes a uniform resource locator (URL) for a website corresponding to the seller of the item, and wherein the method further comprises causing an application of the user device to view the URL.

9. The method of claim 1, wherein the item information includes a unique product code comprising encoded item information.

10. The method of claim 1, wherein the item is a physical item, and wherein the encoded image is displayed on a material surface that is not attached directly to the item.

11. A non-transitory computer-readable medium having stored thereon instructions that are executable by a computer system to cause the computer system to perform operations comprising:
    capturing, via a camera of the computer system, an encoded image corresponding to an item, wherein the encoded image includes information not decipherable by a human;
    decoding the encoded image to obtain item information usable to facilitate a transaction that includes the item, the item information including an item identifier and seller information that uniquely identifies a seller of the item;
    storing the obtained item information;
    presenting, on a visual display component of the computer system, a user interface that includes a command selectable by a user to initiate the transaction;
    subsequent to the presenting, receiving a user input indicating the command was selected;
    responsive to the user input, transmitting, to a service provider computer system, the seller information and additional information usable to facilitate a purchase transaction for the item; and
    subsequent to the transmitting, receiving an indication that the purchase transaction has been processed by the service provider computer system.

12. The non-transitory computer-readable medium of claim 11, wherein the operations further comprise:
    subsequent to the decoding, launching an application that is configured to access web content; and
    causing web content corresponding to the item information to be displayed via the application.

13. The non-transitory computer-readable medium of claim 11, wherein the encoded image is a quick response (QR) image.

14. The non-transitory computer-readable medium of claim 11, wherein the operations further comprise:
    including one or more other items in the transaction that includes the item.

15. The non-transitory computer-readable medium of claim 14, wherein the operations further comprise:
    saving additional information for the one or more other items to the computer system subsequent to decoding individual ones of the one or more additional information items from encoded non-human readable images corresponding to individual ones of the other items.

16. The non-transitory computer-readable medium of claim 11, wherein the computer system is a mobile phone device.

17. A system, comprising:
    a processor;
    a camera;
    a visual display component;
    a memory; and
    a non-transitory computer-readable medium having stored thereon instructions that are executable to cause the system to perform operations comprising:
        capturing, via the camera, an encoded image corresponding to an item, wherein the encoded image includes information not decipherable by a human;
        decoding the encoded image to obtain item information usable to facilitate a transaction that includes the item, the item information including an item identifier and seller information that uniquely identifies a seller of the item;

storing the obtained item information;

presenting, on the visual display component, a user interface that includes a command selectable by a user to initiate the transaction;

subsequent to the presenting, receiving a user input indicating the command was selected;

responsive to the user input, transmitting, to a service provider computer system, the seller information and additional information usable to facilitate a purchase transaction for the item; and subsequent to the transmitting, receiving an indication that the purchase transaction has been processed by the service provider computer system.

18. The system of claim 17, wherein the operations further comprise:

displaying an account creation user interface on the visual display component that prompts the user to create an account with a provider corresponding to the service provider computer system in response to a determination that the user does not have an existing account with the provider.

19. The system of claim 18, wherein the operations further comprise:

facilitating a completion of the transaction using a newly created account made subsequent to displaying the account creation user interface.

20. The system of claim 17, further comprising:

a mobile telephone transceiver;

wherein the transmitting to the service provider computer system is performed via the mobile telephone transceiver.

* * * * *